United States Patent
Hadley

[15] 3,672,689
[45] June 27, 1972

[54] MECHANICAL SEAL ASSEMBLIES

[72] Inventor: Robert C. Hadley, P.O. Box 4358, Odessa, Tex. 79760

[22] Filed: Oct. 5, 1970

[21] Appl. No.: 77,793

[52] U.S. Cl. .................................................. 277/38, 277/91
[51] Int. Cl. ............................................................. F16j 15/34
[58] Field of Search ............................ 277/38–41, 85, 277/87, 91–93

[56] References Cited

UNITED STATES PATENTS

| | | | |
|---|---|---|---|
| 3,198,530 | 8/1965 | Conklin | 277/41 |
| 2,894,770 | 7/1959 | Payne | 277/38 |

FOREIGN PATENTS OR APPLICATIONS

| | | | |
|---|---|---|---|
| 1,333,612 | 6/1963 | France | 277/41 |
| 686,488 | 5/1964 | Canada | 277/91 |

Primary Examiner—Robert I. Smith
Attorney—Marcus L. Bates

[57] ABSTRACT

A shaft seal for effecting a seal between a wall member and a rotatable shaft which prevents flow of pressurized fluid from one to the other side of the wall. A seat is attached to the wall and presents a face to a rotating face of an improved sealing loaded seal assembly so as to present movable seal faces which sealingly engage one another as relative rotation occurs therebetween. A removable slipper sleeve enables the seal assembly to be used in either a balanced or an unbalanced application by effecting a slight modification upon one member of the assembly.

10 Claims, 9 Drawing Figures

PATENTED JUN 27 1972 3,672,689

INVENTOR
ROBERT C. HADLEY
BY MARCUS L. BATES
HIS AGENT

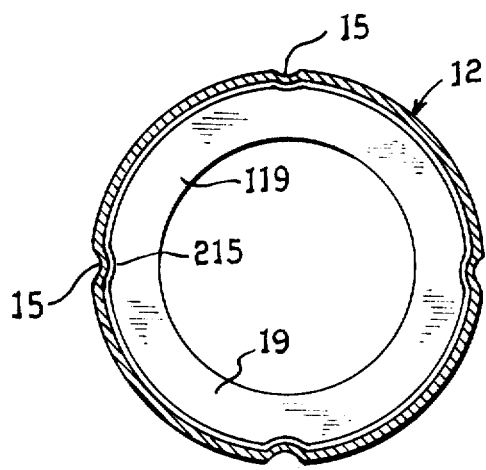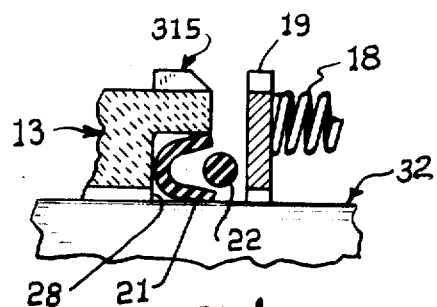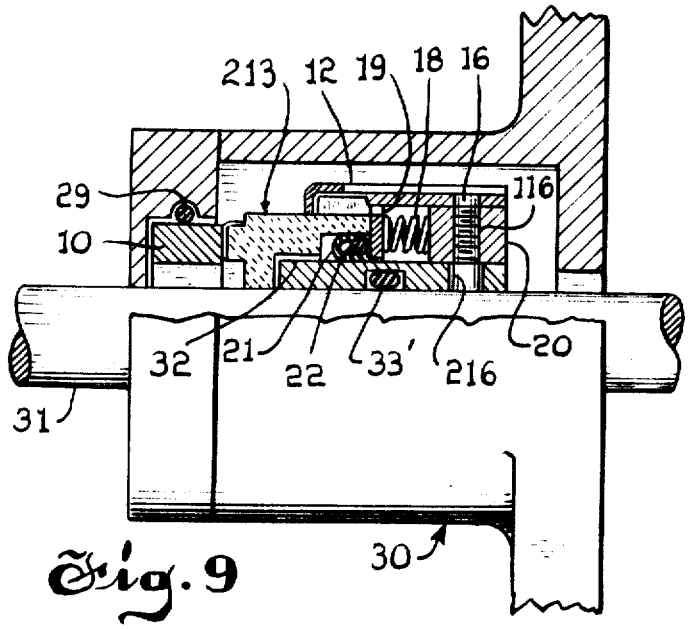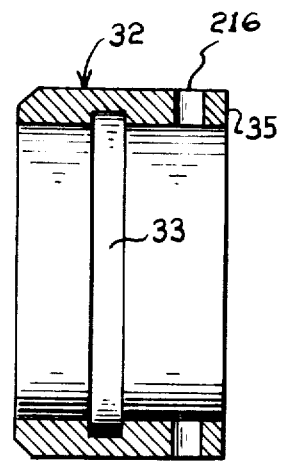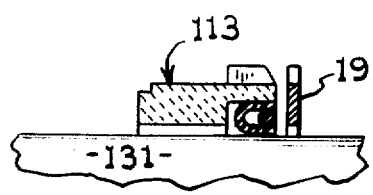

MECHANICAL SEAL ASSEMBLIES

BACKGROUND OF THE INVENTION

Mechanical shaft seals for use in sealing the hole in a wall member through which the shaft extends and which effects a seal by urging one polished face of a rotating carbon member into intimate rotating contact with one polished face of a fixed metallic member are known to those skilled in the art. In order to maintain a seal interface and to compensate for progressive wear of the diametrically opposed cooperative seal faces, the carbon is generally reciprocatingly received within a main housing or shell with the carbon being spring loaded so as to continuously present new wear material at the wearing interface.

In order to attain a suitable seal of the above described type, it has heretofore been necessary to carry out various intricate machining operations so as to form the various complex parts of the mechanical seal from solid pieces of metal stock.

Another drawback to mechanical seals of the prior art is the extensive inventory of parts a supplier must have available to meet the demands of the consumers who require various sizes of shaft seals for various purposes.

It would therefore be desirable to provide an improved mechanical seal having a minimum amount of machine work performed thereon so as to provide a more inexpensive seal assembly. It is also desirable to provide a seal which is comprised of a minimum number of parts so as to improve the efficiency of operation and at the same time effect a savings in cost. It would further be desirable that the simplified seal present new advantages because of the new design concept.

SUMMARY OF THE INVENTION

This invention discloses a mechanical shaft seal assembly for effecting a seal between a wall and a rotatable shaft so as to prevent flow of pressurized fluid from one side of the wall to the other. In carrying out the invention, a seat is mounted to the wall and presents a radially disposed circumferentially extending face which cooperates with a radially disposed circumferentially extending face of a carbon member with the carbon member being biased towards the seat so as to continuously present a new wearing surface. Counterbores and notches formed in the carbon enable it to be reciprocatingly received and captured within an improved shell. Secured within the shell is a spring holder with biasing means associated therewith which forces a metallic disk against the carbon. An improved annular seal is disposed within a cavity formed by one of several counterbores within the carbon. The disk expands the annular seal in a manner to preclude fluid flow therethrough as well as eliminating a source of vibration. The seal together with the spring holder provides attachment means by which the seal assembly can be attached to a rotatable shaft by a common fastener means and at the same time maintains the component parts movably captured therewithin.

An optionally provided slipper sleeve is slidably positioned upon the shaft where it becomes a part of the mechaincal seal assembly so as to readily convert an unbalanced seal assembly into one of the balanced type, and vice versa.

It is therefore a primary object of this invention to provide a simplified housing in the form of a shell for a mechanical seal assembly which captures various components of the seal assembly therewithin in an improved manner.

Another object of the present invention is the provision of a seal means which can be rapidly modified so as to enable the apparatus to be used in a number of different applications.

A further object of the present invention is the provision of an improved mechanical seal having a minimum number of parts therein.

A still further object of this invention is the provision of a mechanical seal having improvements in the method by which fluid flow therethrough is avoided.

The above objects are attained in accordance with the present invention by the provision of a seal assembly made essentially as outlined in the above abstract and summary.

These and various other objects and advantages of this invention will become readily apparent to those skilled in the art upon reading the following detailed description and by referring to the accompanying drawings and claims.

BRIEF DESCRIPTION OF THE DRAWINGS

FIG. 5 is a longitudinal cross-sectional view of a member which can be used in conjunction with the mechanical seal of the foregoing figures;

FIG. 6 is a cross-sectional view taken along line 6—6 of FIG. 2;

FIG. 7 is an enlarged fragmentary partly cross-sectional view of some details of the seal seen in FIG. 2;

FIG. 8 is a modification of the seal seen in FIG. 2; and

FIG. 9 is a part cross-sectional broken view showing the seal assembly of FIGS. 1 and 2 in its operative position.

DETAILED DESCRIPTION OF THE PREFERRED EMBODIMENTS

Figure 1:
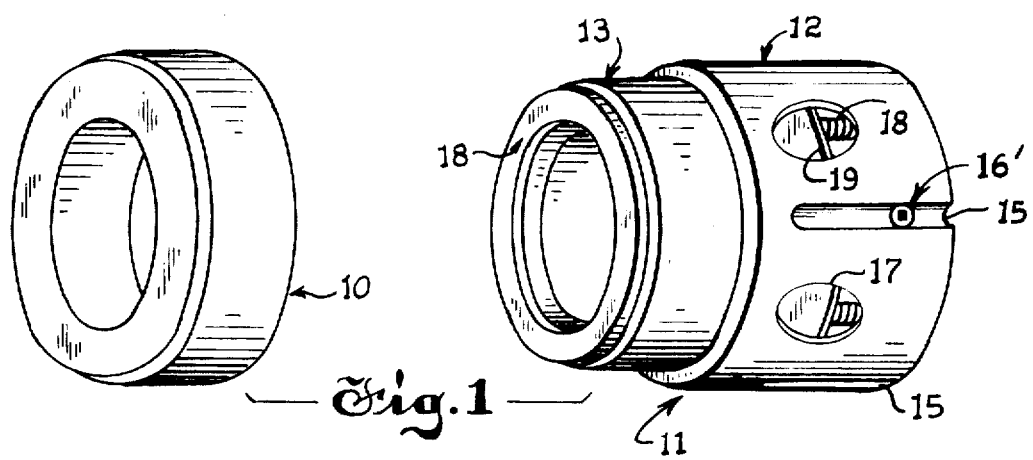
FIG. 1 is a perspective view which discloses a mechanical seal made in accordance with the present invention.
Figure 2:
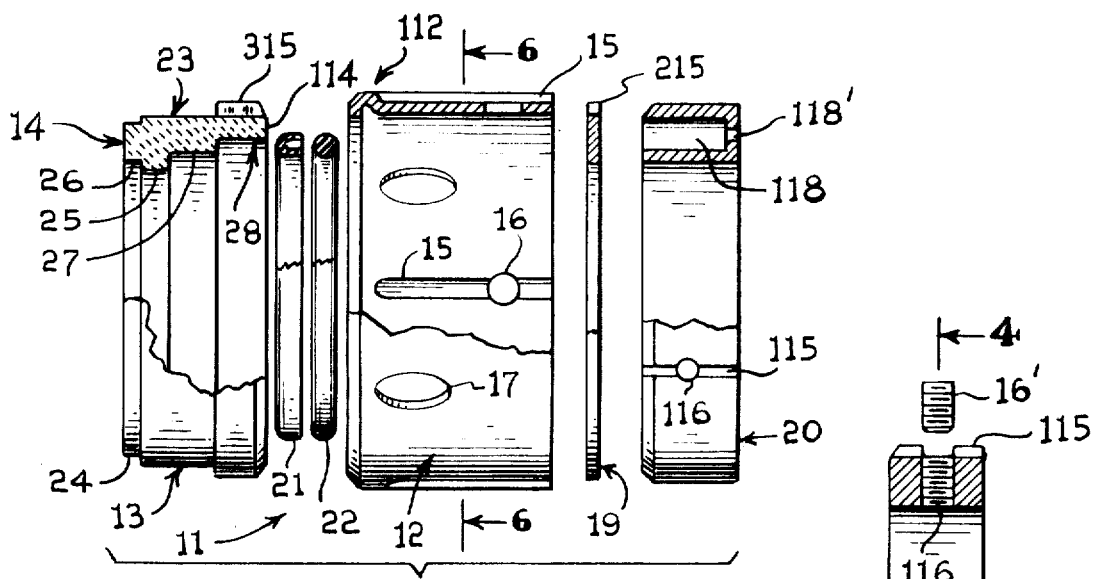
FIG. 2 is an exploded partly cross-sectional side elevational view of the seal assembly seen in FIG. 1.
Figure 3:
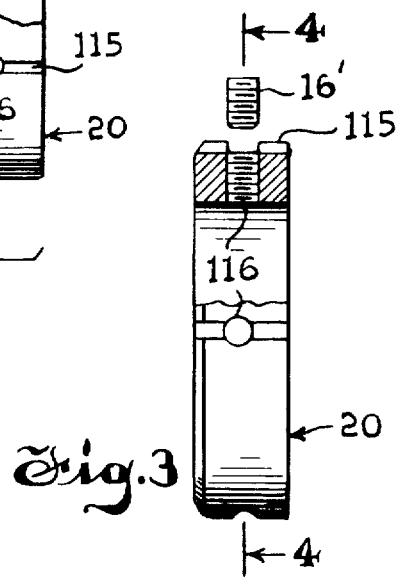
FIG. 3 is a part cross-sectional view taken along line 3—3 of FIG. 4 and shows other details of part of the assembly seen in FIG. 2.
Figure 4:
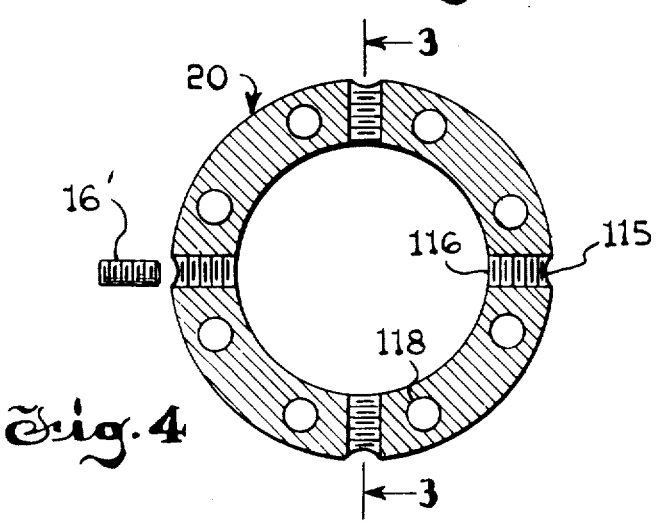
FIG. 4 is a cross-sectional view taken along line 4—4 of FIG. 3.

FIG. 1 discloses a mechanical seal assembly having a fixed seat 10 which can be attached to a wall member and which cooperates with a rotating seal assembly 11 so as to preclude the flow of pressurized fluid through a hole in the wall. The rotating seal assembly includes a shell 12 having radially spaced apart grooves 15 which longitudinally extend from the trailing edge of the seal for a limited distance along the shell. A carbon member 13 having a face 14 at the leading edge thereof is seen to have a marginal portion thereof reciprocatingly protruding from the leading edge of the shell. Apertures 16 receive a fastener means in the form of a screw 16' therethrough. Lightening holes 17 are disposed between each of the grooves and communicate the interior of the seal with the stuffing box within which the entire assembly may be disposed. A plurality of springs 18 are radially spaced apart and disposed about and abut one circumferentially extending face of disk 19.

Looking now to the other of the figures, in conjunction with FIG. 1, it will be seen that a spring holder 20, which is in the form of a ring, is provided with threaded apertures 116 which may be aligned with the before mentioned aperture 16 of the shell. The spring holder is further provided with drive notches 115 which may be aligned with the grooves of the shell so as to enable the shell grooves to be received within the notches. A small counterbore 118' is flow communicated with a larger counterbore 118, with the larger counterbore receiving a marginal end portion of a spring therein to enable the remaining free depending end of the spring to be abuttingly received against disk 19 so as to bias the disk towards an annular seal means. The annular seal means is jointly comprised of a U-cup 21 and O-ring 22. The disk is preferably provided with drive notches 215 which are aligned with the inwardly extending grooves of the shell so as to preclude relative rotation therebetween.

Carbon 13 is optionally provided with a shoulder 24 so as to reduce the width of face 14, and has an inside tunnel comprised of a counterbore 25 for receiving a shaft therethrough. The counterbore enlarges into a second counterbore 27 which further enlarges into a third counterbore 28. Counterbore 25 may additionally be provided with the illustrated shoulder at 26 if desired so as to further reduce the thickness of the seal face or to better align the seal face with the disk face.

The carbon is further provided with drive notches 315 each of which receives one of the grooves 15 therein in the same cooperative manner of the before mentioned disk and spring holder. Each of the radially spaced apart drive notches extends from rear face 114 of the carbon in a forward direction and abruptly ends so as to present the illustrated shoulder, with the shoulder cooperating with the inwardly directed leading edge portion of the shell. This configuration enables the carbon to be captured by and to reciprocate within the shell between the limits provided by the disk as it abuts the spring holder and as the carbon shoulder abuts the internal shell portion forming the leading edge of the shell. Hence a forward and rear stop means is provided between the limits of which the carbon can reciprocatingly travel.

As seen in FIG. 8, the first and second counterbores may be dispensed with when the seal is to be used in an unbalanced application, that is, when the seal is used in low pressure pump assemblies. Where the seal must be balanced, however, it is preferred to use an improved slipper sleeve 32 having O-ring groove 33 formed interiorly thereof which receives O-ring 33' therein so as to seal the interface between the inside peripheral wall portion of the sleeve and the exterior peripheral wall surface of the shaft. Drilled passageways 216 must be aligned with threaded passageway 116 of the spring holder and passageway 16 of the shell so as to enable one of four screws 16' to fasten each of the passageways together and to the shaft.

The annular groove formed by counterbore 27 receives the leading marginal edge portion of the slipper sleeve therein with the trailing edge 35 of the sleeve being aligned with the trailing edge of the spring holder and the shell.

In operation the slipper sleeve is slidably forced onto the shaft along with the rotating seal assembly, and the seat positioned within its provided counterbore, which usually is a removable section of the packing housing. The seal must be properly positioned about the slipper sleeve during the assembly. After each of the screws 16' are properly aligned with its corresponding aperture 216, the entire assembly is positioned so that face 14 of the carbon is biased against the seat face with ample pressure and at the same time there is provided sufficient reciprocal movement of the carbon with respect to the shell so as to provide for wearing of the seal surface.

Where deemed desirable, groove 24 or 26 can either or both be formed on the carbon leading edge for improved balancing action, depending upon the design application of the seal means.

As the spring loaded disk 19 presses against the rear face of the carbon, it also presses O-ring 22 into U-cup 21, thereby expanding the U-cup against the annulus formed by counterbore 28 of the carbon and the slipper sleeve. This action results in a dual unexpected improvement of the seal means because it not only effects a seal between the carbon and the shaft (or slipper ring) so as to preclude fluid flow therethrough, but it also dampens vibrations which would otherwise be imposed on the carbon as a result of shaft eccentricities. In other words, vibrational energies normally imposed at carbon face 14 are eliminated, or minimized, or reduced because of the presence of the annular seal means.

Since the carbon face 14 is axially loaded by a spring loaded disk 19, thereby biasing the coaxially aligned components towards the seat face, and since the disk is loaded with a predetermined force existent about its entire rear peripheral surface, the inherent misalignment of shaft 31 with respect to the housing normally results in a continual "wobble" of the carbon with respect to the shell so long as the carbon face and seat face attempt to run true with respect to one another. This undesired action produces uneven wear because of the side load produced on the carbon face. The presence of annular seal 21, 22 aids in eliminating flexing or movement of the disk and spring each revolution of the shaft which otherwise results from this misalignment. This correction of inherent misalignment reduces uneven wear on the carbon face.

The annular seal means is comprised of two ring members which can be fabricated from plastic, rubber, or rubber-like products. The cup shaped member has spaced apart walls connected together to define a "cup" or a "U" in cross-sectional area. The ring member 22 is round in cross-sectional configuration and is of a size which will force the walls of the cup member apart when received therewithin. This action enables a fluid seal to be effected between the walls forming the annulus at counterbore 28 and at the same time provides a resilient surface against which a part of one face of the disk may partially bear.

The shell 12 is fabricated from a limited length of stainless steel pipe or tubing by turning one marginal edge of the tubing in an inward direction to form the leading edge 112, and by forming the spaced apart grooves 15 which are of a sufficient depth to allow them to capture the drive notches of the carbon, disk, and spring holder. The apertures and lightening holes are preferably formed lastly to avoid deformation of the shell. This expedient eliminates a vast quantity of work which has heretofore been required in mechanical seals of this type. The use of four spaced apart screws is ample for holding the entire assembly firmly affixed to a shaft.

The present invention reduces the number of parts heretofore required in a seal of this type and provides improvements which add to the life of the seal means.

I claim:

1. A shaft seal assembly for effecting a seal between a wall and a rotatable shaft received therethrough so as to prevent flow of pressurized fluid from one side of the wall to the other, comprising:

a seat having a radially disposed circumferentially extending face thereon, said seat adapted to be mounted to a wall;

a carbon member having spaced apart radially disposed circumferentially extending faces thereon with one face defining a forward edge portion and the other face defining a trailing edge portion;

spaced apart longitudinal drive notches formed along a marginal exterior surface of said carbon; means forming at least two longitudinal extending axial counterbores within said carbon;

a cylindrical spring holder having means forming radially spaced apart biasing means thereon;

a disk having diametrically opposed faces thereon;

a seal means; and a shell having a forward end portion and a trailing end portion; radially spaced apart longitudinally extending grooves formed within said shell along a marginal longitudinal portion thereof and adjacent said trailing end; the forward end portion of said shell having a marginal end portion thereof turned inwardly to form a circumferentially extending shoulder;

means on said disk and spring holder for engaging said grooves of said shell to thereby prevent said disk, spring holder, and shell from rotating relative to each other;

a limited length of said carbon being reciprocatingly received within said shell with said driving notches engaged with said grooves of said shell; said spring holder and said disk being received within said shell with a face of said disk abutting the trailing end face of said carbon and with the biasing means abutting the opposed face of the disk;

said seal means being received within one of said counterbores and in abutting relationship with respect to said disk;

said seat, carbon, disk, annular seal means, shell, and spring holder being coaxially disposed with respect to one another and adapted to receive a shaft therethrough with said shell and spring holder being affixed to one another, and said spring holder adapted to be affixed to a shaft, with the face located on the forward edge of said carbon rotatably and sealingly engaging the face of said seat.

2. The shaft seal assembly of claim 1 wherein said annular seal means includes:

two coacting ring members; one ring member including spaced apart wall members connected together to impart said member with a cup-shaped appearance in cross-sectional configuration; the other ring member being round in crossusectional configuration; each ring member being fabricated from a resilient material;

said one ring member being of a sufficient diameter and size to receive said other ring member within said outwardly opening wall members to thereby cause said wall members to be moved apart when the other ring member is forced thereinto.

3. The shaft seal assembly of claim 1 wherein said carbon is provided with still another counterbore with said last counterbore being located intermediate the first two recited counterbores; said last counterbore being smaller than said one counterbore and larger than the remaining said two longitudinally extending axial counterbores;

a slipper sleeve having a leading edge, a trailing edge, and an axial bore, said axial bore adapted to enable the sleeve to be slidably received on a shaft;

the leading edge of said sleeve being received within said still another counterbore to thereby enable said annular seal to be received within the annulus formed between a marginal exterior portion of the sleeve and a marginal portion of said one counterbore.

4. The shaft seal assembly of claim 1 wherein said cylindrical spring holder has an annular bore for receiving a shaft therethrough;

said radially spaced apart biasing means including radially spaced apart counterbores circumferentially disposed about and parallel to said annular bore thereof;

a spring having a longitudinal axis parallel to the last said annular bore and having a limited longitudinal portion thereof received within a counterbore of said spring holder;

the free depending terminal end of said spring being received against said disk for biasing said disk towards the leading edge of said shell.

5. The shaft seal assembly of claim 1 wherein there is further included a slipper sleeve; said slipper sleeve having an outside diameter which enables it to be placed within the smaller of two longitudinally extending axial counterbores; means forming an axial counterbore through said sleeve to thereby enable said sleeve to be received upon a shaft in sealed relationship therewith.

6. The shaft seal assembly of claim 1 wherein said annular seal means includes:

two coacting ring members; one ring member including spaced apart wall members which imparts said member with a cup-shaped appearance in cross-sectional configuration; the other ring member being round in cross-sectional configuration; each ring member being fabricated from a resilient material;

said one ring member being of a sufficient diameter and size to receive said other ring member within said outwardly opening wall member to cause said wall members to be moved apart when said other ring member is forced thereinto;

said cylindrical spring holder has an annular bore for receiving a shaft therethrough;

said radially spaced apart biasing means including radially spaced apart counterbores circumferentially disposed about and parallel to said annular bore thereof;

a spring having a longitudinal axis parallel to the last said annular bore and having a limited longitudinal portion thereof received within a counterbore of said spring holder;

the free depending terminal end of said spring being received against said disk for biasing said disk towards the leading edge of said shell.

7. The shaft seal assembly of claim 1 wherein said annular seal means includes:

two coacting ring members; one ring member including spaced apart wall members which imparts said member with a cup-shaped appearance in cross-sectional configuration; the other ring member being round in cross-sectional configuration; each ring member being fabricated from a resilient material;

said one ring member being of a sufficient diameter and size to receive said other ring member within said outwardly opening wall member to cause said wall members to be moved apart when the other ring member is forced thereinto;

means providing said carbon with still another counterbore with said last counterbore being located intermediate the first recited counterbores; said last counterbore being smaller than said said one counterbore and larger than the remaining said two longitudinally extending axial counterbores;

a slipper sleeve having a leading edge, a trailing edge, and an axial bore which enables the sleeve to be slidably received on a shaft;

the leading edge of said sleeve being received within said still another counterbore to thereby enable said annular seal to be received within the annulus formed between a marginal exterior portion of the sleeve and a marginal portion of said one counterbore.

8. The shaft seal assembly of claim 1 wherein said cylindrical spring holder has an annular bore for receiving a shaft therethrough;

said radially spaced apart biasing means including radially spaced apart counterbores circumferentiallyddisposed about and parallel to said annular bore thereof;

a spring having a longitudinal axis parallel to the last said annular bore and having a limited longitudinal portion thereof received within a counterbore of said spring holder;

a spring, the free depending terminal end of said spring being received against said disk for biasing said disk towards the leading edge of said shell;

means forming a slipper sleeve; said slipper sleeve having an outside diameter which enables it to be placed within the smaller of two longitudinally extending axial counterbores; means forming an axial counterbore through said sleeve to thereby enable said sleeve to be received upon a shaft in sealed relationship therewith.

9. The shaft seal assembly of claim 8 wherein said annular seal means includes:

two coacting ring members; one ring member including spaced apart wall members which imparts said member with a cup-shaped appearance in cross-sectional configuration; the other ring member being round in cross-sectional configuration; each ring member being fabricated from a resilient material;

said one ring member being of a sufficient diameter and size to receive said other ring member within said outwardly opening wall member to cause said wall members to be moved apart when the other ring member is forced thereinto.

10. A shaft seal assembly for effecting a seal between a wall and a rotatable shaft received therethrough so as to prevent flow of pressurized fluid from one side of the wall to the other, comprising:

a seat having a radially disposed circumferentially extending face thereon, said seat adapted to be mounted to a wall;

a carbon member having spaced apart radially disposed circumferentially extending faces thereon with one face defining a forward edge portion and the other face defining a trailing edge portion;

spaced apart longitudinal drive notches formed along a marginal exterior surface of said carbon; means forming at least two longitudinal extending axial counterbores within said carbon;

a cylindrical spring holder having means forming radially spaced apart biasing means thereon;

a disk having diametrically opposed faces thereon;

an annular seal means; and a shell having a forward end portion and a trailing end portion; radially spaced apart longitudinally extending grooves formed within said shell along a marginal longitudinal portion thereof and adjacent said trailing end; the forward end portion of said shell having a marginal end portion thereof turned inwardly to form a circumferentially extending shoulder;

said disk and said spring holder each have means forming spaced apart drive notches about the outer marginal edge portion thereof;

said drive notches of said disk and spring holder arranged to receive said grooves of said shell therein, to thereby maintain said carbon, disk, and spring holder aligned with said shell;

a limited length of said carbon being reciprocatingly received within said shell with said driving notches engaged with said grooves of said shell; said spring holder and said disk being received within said shell with a face of said disk abutting the trailing end face of said carbon and with the biasing means abutting the opposed face of the disk;

said annular seal means being received within one of said counterbores and in abutting relationship with respect to said disk;

said seat, carbon, disk, annular seal means, shell, and spring holder being coaxially disposed with respect to one another and adapted to receive a shaft therethrough with said shell and spring holder adapted to be affixed to the shaft with the face located on the forward edge of said carbon rotatably and sealingly engaging the face of said seat.

* * * * *